(12) United States Patent
Nakayama et al.

(10) Patent No.: US 11,703,374 B2
(45) Date of Patent: Jul. 18, 2023

(54) ONBOARD SYSTEM, CHARGING SYSTEM, CHARGING METHOD, AND PROGRAM

(71) Applicant: MITSUBISHI HEAVY INDUSTRIES MACHINERY SYSTEMS, LTD., Kobe (JP)

(72) Inventors: Hiroyuki Nakayama, Tokyo (JP); Kenta Nakao, Tokyo (JP); Takaaki Sunagawa, Kobe (JP); Koichi Kanehara, Kobe (JP)

(73) Assignee: MITSUBISHI HEAVY INDUSTRIES MACHINERY SYSTEMS, LTD., Kobe (JP)

( * ) Notice: Subject to any disclaimer, the term of this patent is extended or adjusted under 35 U.S.C. 154(b) by 1091 days.

(21) Appl. No.: 16/463,662

(22) PCT Filed: Feb. 10, 2017

(86) PCT No.: PCT/JP2017/004898
§ 371 (c)(1),
(2) Date: May 23, 2019

(87) PCT Pub. No.: WO2018/146790
PCT Pub. Date: Aug. 16, 2018

(65) Prior Publication Data
US 2020/0173838 A1 Jun. 4, 2020

(51) Int. Cl.
*G01G 19/03* (2006.01)
*G01G 19/02* (2006.01)
(Continued)

(52) U.S. Cl.
CPC ......... *G01G 19/035* (2013.01); *G01G 19/021* (2013.01); *G01P 13/00* (2013.01); *G06Q 20/085* (2013.01); *G06Q 2240/00* (2013.01)

(58) Field of Classification Search
CPC .... G01G 19/021; G01G 19/035; G01P 13/00; G06Q 20/085; G06Q 2240/00
See application file for complete search history.

(56) References Cited

U.S. PATENT DOCUMENTS

| 2003/0097335 A1* | 5/2003 | Moskowitz | G07B 15/063 705/52 |
| 2004/0178005 A1* | 9/2004 | Carlstrom | G01G 19/10 177/139 |

(Continued)

FOREIGN PATENT DOCUMENTS

| JP | S62-224876 A | 10/1987 |
| JP | H11-218438 A | 8/1999 |

(Continued)

OTHER PUBLICATIONS

PCT/ISA/210, "International Search Report for International Application No. PCT/JP2017/004898," dated Mar. 28, 2017.
(Continued)

*Primary Examiner* — Natalie Huls
(74) *Attorney, Agent, or Firm* — Manabu Kanesaka; Kenneth Berner; Benjamin Hauptman

(57) ABSTRACT

A charging system includes load meters mounted in a vehicle, the load meters each measuring a load exerted on an axle or a wheel and deciding a measurement result and an onboard unit that acquires the measurement results of the load meters and is capable of communicating weight information on the weight of the vehicle based on the measurement results to a roadside machine.

9 Claims, 6 Drawing Sheets

(51) Int. Cl.
    *G06Q 20/08* (2012.01)
    *G01P 13/00* (2006.01)

(56) References Cited

U.S. PATENT DOCUMENTS

| | | | | |
|---|---|---|---|---|
| 2013/0293392 A1* | 11/2013 | Hanisch | ............... | G08C 17/02 |
| | | | | 340/870.07 |
| 2014/0114558 A1* | 4/2014 | Singh | ............... | G01G 19/086 |
| | | | | 701/1 |
| 2015/0100273 A1* | 4/2015 | Safdar | ............... | G01G 23/3735 |
| | | | | 702/175 |
| 2021/0097854 A1* | 4/2021 | Guim Bernat | ....... | G08G 1/0116 |

FOREIGN PATENT DOCUMENTS

| | | |
|---|---|---|
| JP | 2005-092283 A | 4/2005 |
| JP | 2005-100201 A | 4/2005 |
| JP | 2013-114494 A | 6/2013 |

OTHER PUBLICATIONS

PCT/ISA/237, "Written Opinion of the International Searching Authority for International Application No. PCT/JP2017/004898," dated Mar. 28, 2017.

* cited by examiner

ONBOARD SYSTEM, CHARGING SYSTEM, CHARGING METHOD, AND PROGRAM

RELATED APPLICATIONS

The present application is National Phase of International Application No. PCT/JP2017/004898 filed Feb. 10, 2017, the disclosure of which is hereby incorporated by reference herein in its entirety.

TECHNICAL FIELD

The present invention relates to an onboard system, a charging system, a charging method, and a program.

BACKGROUND ART

Today, a charging system used in toll roads such as highways includes a toll decision unit and a vehicle type determination system (vehicle type determination apparatus) for determining the vehicle type classification of the traveling vehicle. In such a case, the toll decision unit decides the toll (toll amount) related to the vehicle type classification determined by the vehicle type determination system.

As a related art, Patent Document 1 discloses a charging system provided on an entry lane, and the charging system identifies whether each vehicle is in an unloaded state or in a loaded state based on axle loads of a front axle and a rear axle of each vehicle, which are measured by use of an axle load meter, and calculates a toll related to the vehicle type classification in the unloaded state or the vehicle type classification in the loaded state.

CITATION LIST

Patent Document

Patent Document 1: JP 2005-092283 A

SUMMARY OF INVENTION

Problem to be Solved by the Invention

The charging system as disclosed in the above-described Patent Document 1 can charge the toll related to the loading weight to each traveling vehicle. However, since such charging system requires an installation work of the axle load meter on a road surface, during the installation work of the charging system, lanes need to be closed.

Thus, an object of the present invention is to provide an onboard system that does not require closure of any lane in the installation work of the charging system.

Solution to Problem

An onboard system (10) according to an aspect of the present invention includes a plurality of load meters (30) that are mounted in a vehicle, the load meters each measuring a load exerted on an axle or a wheel and deciding a measurement result, and an onboard unit (20) that acquires the measurement results of the load meters and is capable of communicating weight information on the weight of the vehicle based on the measurement results to a roadside machine (40).

According to this aspect, the onboard system can communicate the information on the measured weight of the vehicle to the roadside machine. Thus, there is no need to install equipment for measuring the weight of the vehicle on a road surface. Therefore, the charging system equipped with the onboard system does not need to close the lane for the installation work.

An onboard system according to an aspect of the present invention further includes a static sensor (21) that detects that the vehicle is static and transmits a static detection signal to the onboard unit, and in response to the static detection signal, the onboard unit transmits a request signal to each of the load meters, and in response to the request signal, each of the load meters decides the measurement result of the corresponding axle.

According to this aspect, the onboard system uses the static load measured when the vehicle is static to decide the static load of each of the axles. Therefore, the onboard system can decide the measurement result without being affected by vibration and acceleration during traveling.

In an onboard system according to an aspect of the present invention, each of the load meters calculates an average value of loads of the vehicle during traveling, and decides a static load of each of the axles as the measurement result.

According to this aspect, the onboard system can convert a dynamic load measured during traveling into the static load. For this reason, since the static load can be acquired immediately before the entry into a tollgate, a toll related to the latest static load can be charged without being affected by vibrations and acceleration.

In an onboard system according to an aspect of the present invention, the load meters are mounted in each of a towing vehicle and a towed vehicle as the vehicle, and the onboard unit acquires measurement results of the load meters, and transmits the weight information on the weight of the towing vehicle based on the measurement result and weight information on the weight of the towed vehicle based on the measurement result to a roadside machine.

According to this aspect, since the onboard system transmits the weight information on the weight of the towing vehicle and weight information on the weight of the towed vehicle to a roadside machine, the onboard system can transmit each axle load of the towing vehicle and each axle load of the towed vehicle in a single communication.

A charging s according to an aspect of the present invention includes the roadside machine capable of communicating with the onboard system, and a toll decision unit (51C) that decides a toll based on the information on the weight of the vehicle, the information being received by the roadside machine.

According to this aspect, the charging system can use the information on the weight of the vehicle, which is measured by the onboard system, to decide the toll. Therefore, the charging system does not need to close the lane in the installation work.

A charging system according to an aspect of the present invention further includes weight information calculation unit (51B) that calculates a representative value of the measurement results of each of the axles.

According to this aspect, the charging system can decide a toll related to the representative value of the measurement results of each of the axles. The magnitude of the effect on road damage in units of vehicles is related to, for example, a representative value such as maximum value, average value, or mean value of the axle load of the vehicle (including loaded goods). For this reason, the charging system can charge the magnitude of the effect on road damage.

In a charging system according to an aspect of the present invention, the representative value is a maximum value or an average value of the measurement results of each of the axles.

According to this aspect, since the charging system decides the toll related to the maximum value of the measurement results of each axle, even in the case of the vehicle having the same total weight, the charging system can charge a toll related to the local maximum load in the unit of axle.

According to this aspect, since the charging system decides the toll related to the average value of the measurement results of each axle, even in the case of the vehicle having the same total weight, the charging system can charge a toll related to the number of axles.

A charging system according to an aspect of the present invention further includes a weight information calculation unit that calculates a sum of the measurement results of the axles.

According to this aspect, the charging system decides the toll related to the sum of the measurement results of the axles and therefore, can charge a toll related to the total weight of the vehicle. In the case where conditions such as vehicle type, the number of axles, and imbalance of loaded goods are the same, since the magnitude of the effect on the road damage in the unit of vehicle relates to the total weight of each vehicle, the toll can be charged according to the magnitude of the effect on the road damage.

A charging method according to an aspect of the present invention includes a load measurement step of measuring a load exerted on an axle or a wheel and deciding a measurement result by use of a plurality of load meters mounted in a vehicle, a measurement result communication step of acquiring the measurement result and communicating weight information on the weight of the vehicle based on the measurement result to the roadside machine by use of an onboard unit of the vehicle, and a toll decision step of deciding a toll based on the information on the weight of the vehicle, the information being received by the roadside machine.

A program according to an aspect of the present invention causes a computer of an onboard system including a plurality of load meters, the load meters each being mounted in a vehicle and measuring a load exerted on an axle or a wheel, to function as a vehicle information holding unit (20A) that holds information on the vehicle, and a measurement result processing unit (20B) that acquires measurement results of the load meters, adds the information on the vehicle to information on the weight of the vehicle based on the measurement results, and transmits the information to a roadside machine.

A program according to an aspect of the present invention causes a computer of a charging system to function as a weight information acquisition unit (51A) that is mounted in a vehicle and acquires information on the weight of the vehicle based on a measurement result determined by measuring a load exerted on an axle or a wheel, a weight information calculation unit that calculates information on the weight of the vehicle, and a toll decision unit that decides a toll based on the information on the weight of the vehicle, the information being received by a roadside machine.

Advantageous Effect of Invention

An aspect of the present invention provides an onboard system that does not need to close a lane for an installation work of a charging system.

DESCRIPTION OF EMBODIMENTS

An embodiment of the present invention will be described below with reference to FIG. 1 to FIG. 5.

Overall Configuration

An overall configuration of a charging system 1 will be described below.

Figure 1:
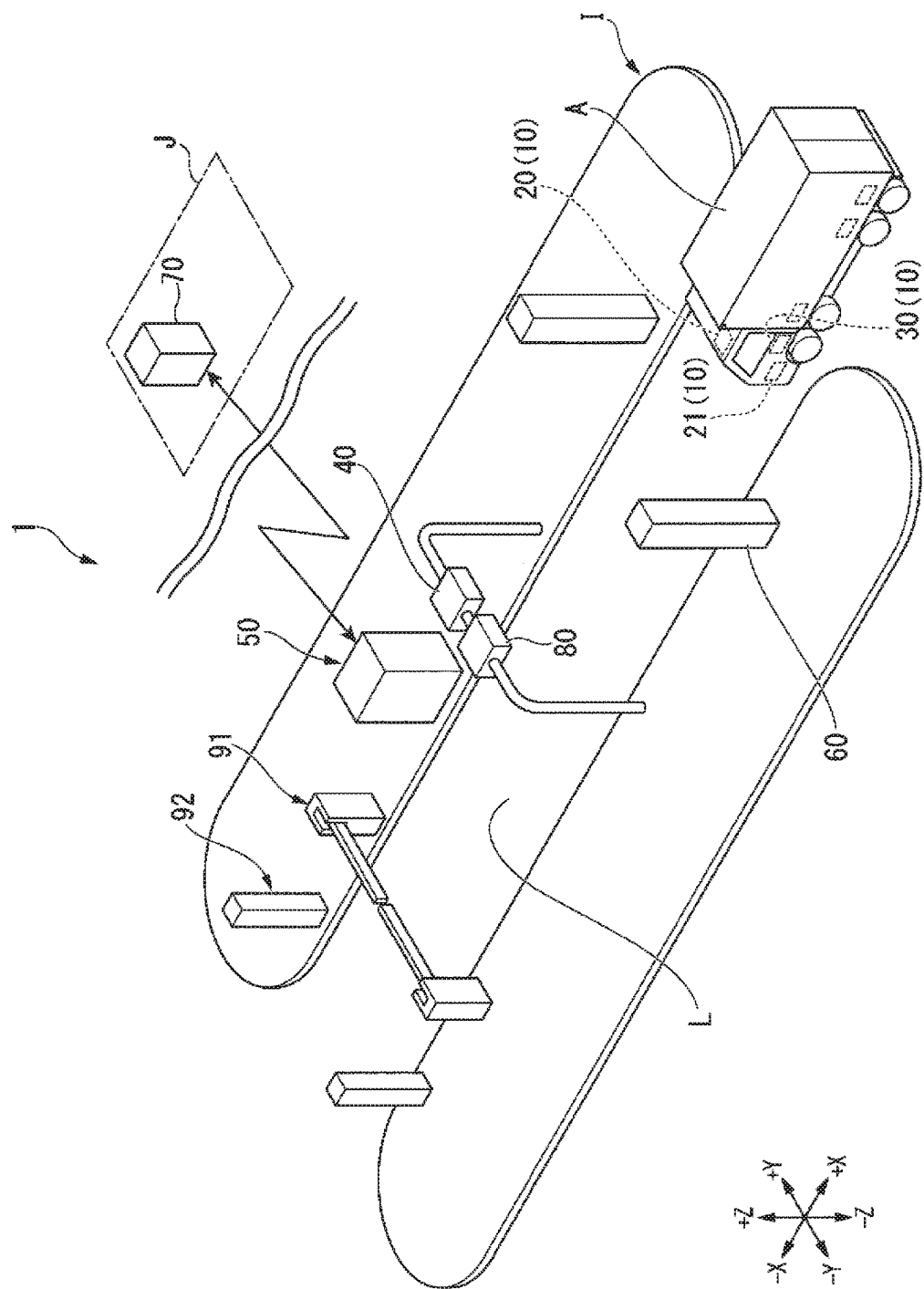
FIG. 1 is a schematic view of an embodiment of the present invention.

As illustrated in FIG. 1, the charging system 1 is provided at an exit toll gate (or an entry toll gate for some types of toll systems) of a highway, which is a toll road. The charging system 1 is a facility for collecting, from a user of the highway, a toll according to the vehicle-type classification of a vehicle A, in which the user is on hoard.

The vehicle A is traveling in a lane L extending from the highway side to the open road side in the charging system 1 provided at the exit toll gate. Islands I are laid on both sides of the lane L. Various devices that constitute the charging system 1 are located on the islands I.

Hereinafter, the direction in which the lane L extends (±X direction in FIG. 1) is referred to as "lane direction". Further, the highway side of the lane L in the lane direction (+X direction side in FIG. 1) is also referred to as "upstream side". Furthermore, the open road side of the lane L in the lane direction (−X direction side in FIG. 1) is also referred to as "downstream side"

Further, the width direction of the lane L is referred to as lane width direction (±Y direction in FIG. 1), and the height direction of the vehicle A is referred to as vertical direction (±Z direction in FIG. 1).

Figure 2:
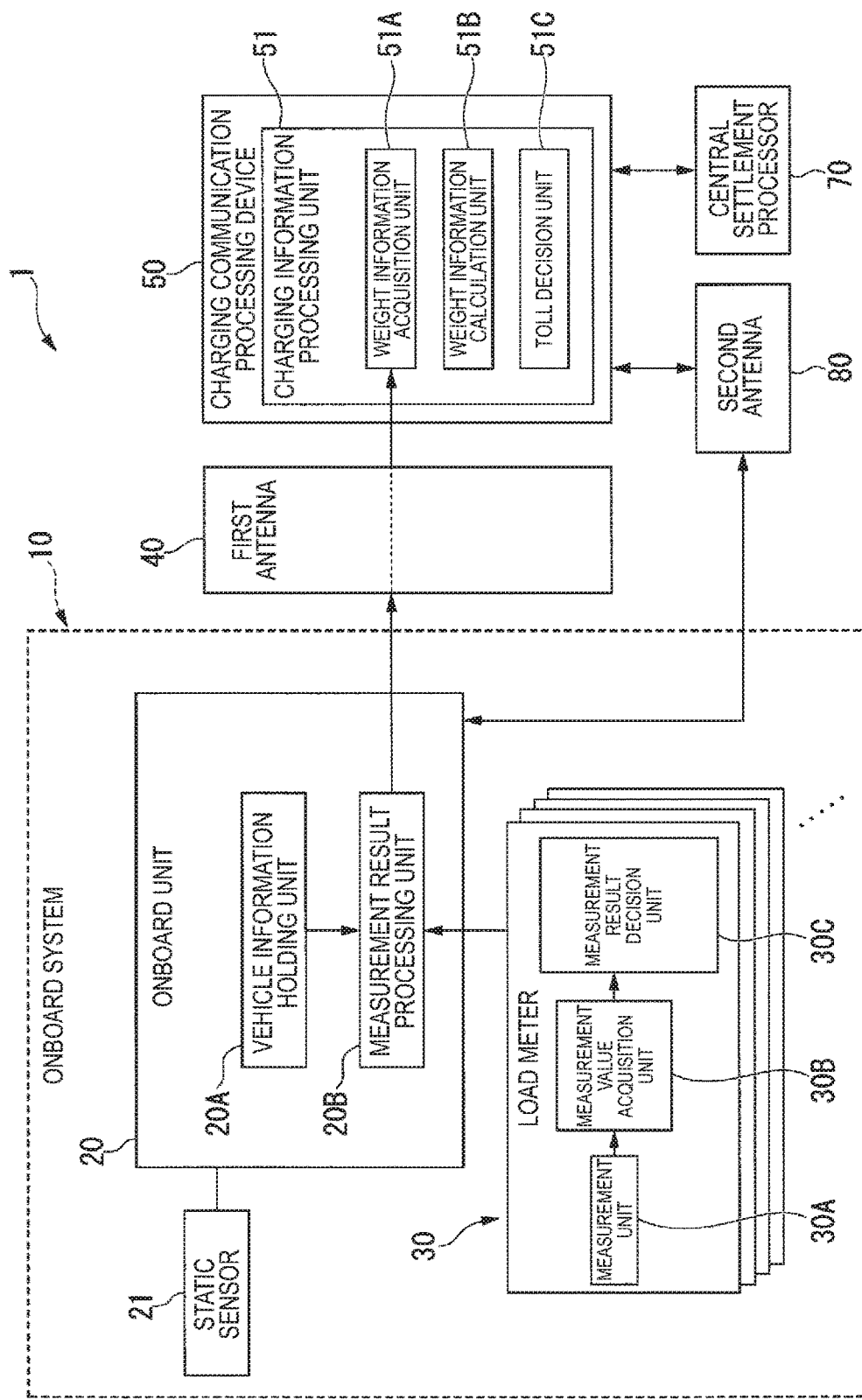
FIG. 2 is a block diagram of the embodiment of the present invention.

As illustrated in FIG. 1 and FIG. 2, the charging system 1 includes a first antenna 40 (roadside machine), a charging communication processor 50, and a second antenna 80, and executes charging processing using a wireless communication system (Electronic Toll Collection System (ETC) (trade name)), RFID, and the like). Further, the charging system 1 further includes an entry-side vehicle detector 60, a departure controller 91, and a departure-side vehicle detector 92.

In the present embodiment, the entry-side vehicle detector 60, the first antenna 40, the charging communication processor 50, the departure controller 91, and the departure-side vehicle detector 92 in the charging system 1 are provided on the roadside in this order from the upstream side to the downstream side. The second antenna 80 is provided on the roadside so as to be located at the almost same position as the first antenna 40 in the lane direction (±X direction), and be aligned with the first antenna 40 in the lane width direction.

An onboard system 10 is mounted in the vehicle A traveling in the lane L. The onboard system 10 communicates with the first antenna 40 and the second antenna 80 in a wireless manner (hereinafter, simply referred to as "wireless communication").

The onboard system 10 includes an onboard unit 20 and a plurality of load meters 30.

The charging communication processor 50 is a processing unit that executes a series of charging processing of the charging system 1. In the present embodiment, the charging communication processor 50 includes a charging information processing unit 51. The charging information processing unit 51 functionally includes a weight information acquisition unit 51A, a weight information calculation unit 51B, and a toll decision unit 51C.

In the present embodiment, a below-mentioned program is executed, causing a computer to function as the weight information acquisition unit 51A, the weight information calculation unit 51B, and the toll decision snit 51C.

Figure 3:
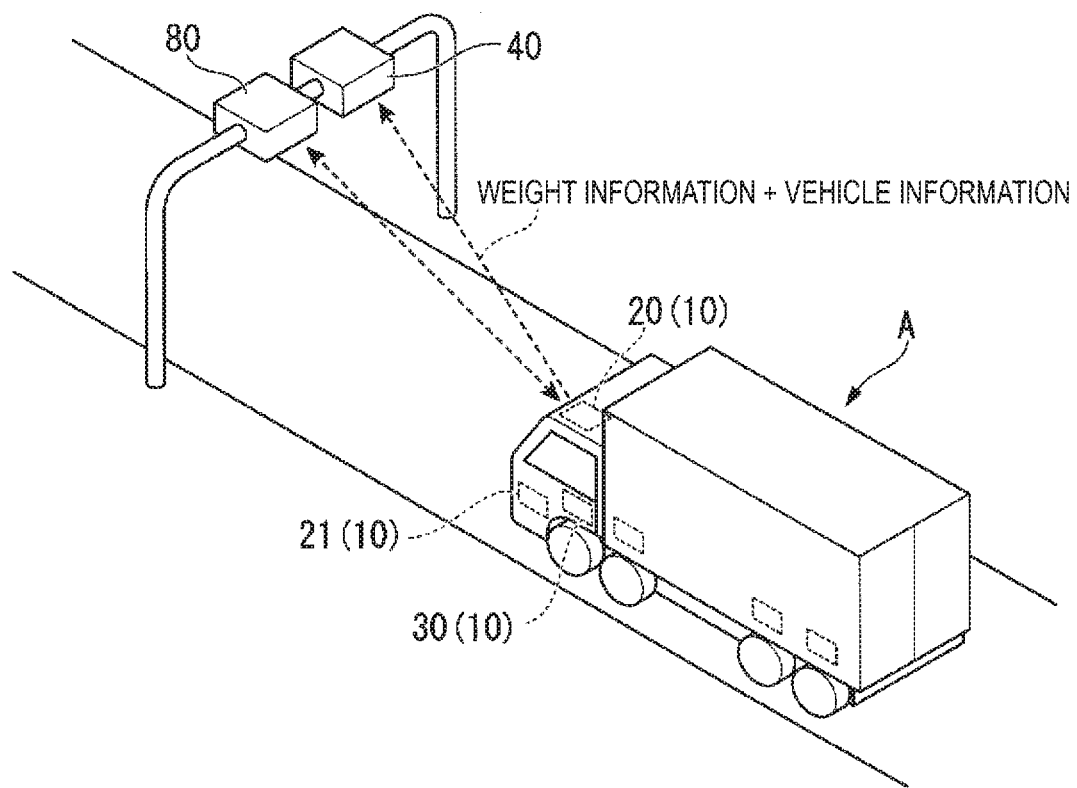
FIG. 3 is a view illustrating details of the embodiment of the present invention.

The first antenna 40 performs wireless communication with the onboard unit 20, and as illustrated in FIG. 3, to receive vehicle information including a vehicle ID of the vehicle A and weight information.

The second antenna 80 performs wireless communication with the onboard unit 20 of the vehicle A to receive detail information (the number of axles, the number of wheels of each axle, vehicle ID, vehicle type classification, card information, entry information, and the like) of the passing vehicle A.

In addition, the second antenna 80 transmits charging data including a result of the charging processing to onboard unit 20 of the passing vehicle A.

The first antenna 40 and the second antenna 80 are capable of transmitting and receiving electromagnetic wave having a predetermined frequency (for example, about 5.8 GHz), and performs wireless communication with the onboard unit 20 mounted in the coming vehicle A via the electromagnetic wave. The frequency of the electromagnetic wave used by first antenna 40 in wireless communication may be the same as or different from the frequency of the electromagnetic wave used by the second antenna 80 in wireless communication.

The charging communication processor 50 receives the vehicle information including the vehicle ID of the vehicle A and the weight information, which is received by the first antenna 40, from the first antenna 40 in a wired or wireless manner. The charging communication processor 50 receives the detail information including the vehicle type classification of the vehicle A, which is received by the second antenna 80, from the first antenna 40 in a wired or wireless manner. At this time, charging communication processor 50 may adopt a weight charging method of using only axle load information out of the vehicle type classification and axle load information and charging a toll related to the axle information. Alternatively, the charging communication processor 50 may concurrently adopt vehicle type classification charging and weight charging by using the vehicle type classification and the axle load information and charging a toll related to the vehicle type classification and the axle load information.

As illustrated in FIG. 1 and FIG. 2, the charging communication processor 50 outputs the acquired information and the result of the charging processing to a central settlement processor 70 (superior device) installed at a remote location J.

The entry-side vehicle detector 60 determines the presence or absence of the vehicle A (vehicle body) traveling in the lane L, through a floodlight and a light sensor, to thereby detect passing (entry) of one vehicle, the vehicle A, as vehicle passing information. The floodlight and the light sensor are located on islands I and face each other across the lane L in the lane width direction (±Y direction).

The departure controller 91 is located downstream of the lane L and controls the departure of the vehicle A traveling in the lane L. For example, in the case where the charging processing of the vehicle A has not normally, performed, the departure controller 91 closes the lane L to limit the leaving of the vehicle A. In the case where the charging processing of the vehicle A has normally completed, the departure controller 91 opens the lane L.

The departure-side vehicle detector 92 is located most downstream of the lane L and detects the exit of the vehicle 4 from the charging system 1.

Onboard System

The configuration and function of the onboard system 10 will be described, below in detail.

The vehicle A having a plurality of axles includes the onboard unit 20 and the plurality of load meters 30. As illustrated in FIG. 3, in the present embodiment, the vehicle A includes one onboard unit 20, one static sensor 21, and the same number of load meters 30 as the number of axles of the vehicle A. In FIG. 3, since the number of axles of the vehicle A is four, the vehicle A includes four load meters 30.

Each of the load meters 30 includes a measurement unit 30A, a measurement value acquisition unit 301, and a measurement result decision unit 30C.

The measurement unit 30A is installed at each axle of the vehicle A, and measures the load applied to each axle at each moment at all times.

Here, to distinguish "load applied to each axle at each moment" from the "axle load" decided by the below-mentioned measurement result decision unit 30C, "load applied to each axle at each moment" is hereinafter referred to as "instantaneous axle load".

Each instantaneous axle load is acquired by measuring the load exerted to the axle or wheel. In the present embodiment, a suspension device (suspension) related to each axle is provided with a displacement sensor such as a strain gauge to measure the instantaneous axle load of each axle. In present embodiment, the suspension device that suspends each axle is provided with a displacement sensor.

In a modification, in the case where wheels are suspended from the respective suspension devices, a measurement value of the displacement sensor provided at the suspension device suspending one of the wheels of each axle may be the instantaneous axle load of each axle.

In another modification, in the case where wheels are suspended from the respective suspension devices, each suspending device may be provided with the displacement sensor, and an average value of values measured by the displacement sensors for each axle may be the instantaneous axle load of each axle.

The measurement result decision unit 30C sequentially acquires the instantaneous axle load measured by the measurement unit 30A from the measurement unit 30A via the measurement value acquisition unit 30B. The measurement result decision unit 30C sequentially calculates the average value of the acquired measurement values. The measurement result decision unit 30C determines whether a change in the newly-acquired measurement value is large, and when determining that the change in the measurement value is large (change in the load is large), resets the average value. Whether the change in the newly-acquired measurement value is large is determined, for example, based on the comparison with measurement values for a previous predetermined period. In a case where an average value has been calculated once, the measurement result decision unit 30C may compare the calculated average value with the newly-acquired measurement value to determine the change in measurement.

In response to a request signal of the below-mentioned onboard unit 20, the measurement result decision unit 30C decides the calculated average value at a timing requested by the onboard unit 20, as an axle load (measurement result), and outputs the axle load to the onboard unit 20.

Here, the onboard system 10 further includes the static sensor 21 including a speedometer, an accelerometer, and a tachometer to measure the speed of the vehicle A, the acceleration of vehicle A in the vertical direction, and the revolution of the axle of the vehicle A, thereby detecting the static of the vehicle A. When determining the static of the vehicle A, the static sensor 21 transmits a static detection signal to the onboard unit 20. Then, when receiving the static detection signal, the onboard unit 20 outputs the request signal of the axle load to each measurement result decision unit 30C.

In a modification, the static sensor 21 may detect the static state of the vehicle A using signals from the speedometer, the accelerometer, and the tachometer, which are mounted in the vehicle A.

Thereby, the onboard system 10 can decide the axle load of the vehicle A in the static state.

Meanwhile, in the static state of the vehicle A, the vehicle A may be stopped state for loading and unloading of goods loaded in the vehicle A. Thus, while the static sensor 21 determines that the vehicle is static, the onboard system 10 in the present embodiment sequentially calculates the average value of the instantaneous axle of the vehicle A, and resets the average value each time the load changes due to loading/unloading of the goods. The onboard system 10 decides the axle load at start of traveling, when it cannot be determined that the vehicle A is static.

The measurement result decision unit 30C acquires the measurement value from the measurement unit 30A via the measurement value acquisition unit 30B. However, the measurement result decision unit 30C may acquire any analog or digital signal as long as it indicates load information related to the measurement value. Similarly, for the axle load, the measurement result decision unit 30C may offer any analog or digital signal as long as it load information related to the axle load.

The onboard unit 20 includes a vehicle information holding unit 20A and a measurement result processing unit 20B.

In the present embodiment, a below-mentioned program is executed, causing a computer to function as the vehicle information holding unit 20A and the measurement result processing unit 20B.

The vehicle information holding unit 20A holds the vehicle ID of each vehicle, and notifies the measurement result processing unit 20B of the held vehicle ID.

The measurement result processing unit 20B acquires the vehicle ID as well as each axle load decided by the measurement result decision unit 30C. In the present embodiment, the measurement result processing unit 20B adds the vehicle ID to the acquired axle load, and transmits the axle load with the vehicle ID to the first antenna 40. Since the same vehicle ID is added to the axles loads acquired by the onboard system of the vehicle A, the axle loads can be distinguished from axle loads acquired in other vehicles. This makes equipment for distinguishing vehicles unnecessary.

In the present embodiment, the measurement result processing unit 20B adds the vehicle ID to each axle load acquired from the load meter 30, and further adds identification information on each related axle (the axle of the front wheel, the axle of the rear wheel, the axle of the front/front wheel, the axle of the front/rear wheel, the axle of the rear/front wheel, the axle of the rear/rear wheel) thereto and then, transmits the axle load to the first antenna 40. By transmitting each axle load, with the identification information of each axle added, to the charging communication processor 50 via the first antenna 40, the charging communication processor 50 can associate the axle load of the vehicle A with the axle of the vehicle A one to one.

As a modification, when the charging communication processor 50 does not need to identify the axle related to each axle load, the measurement result processing unit 20B may not add the identification information of each related axle.

Modification of Onboard System

Figure 4:
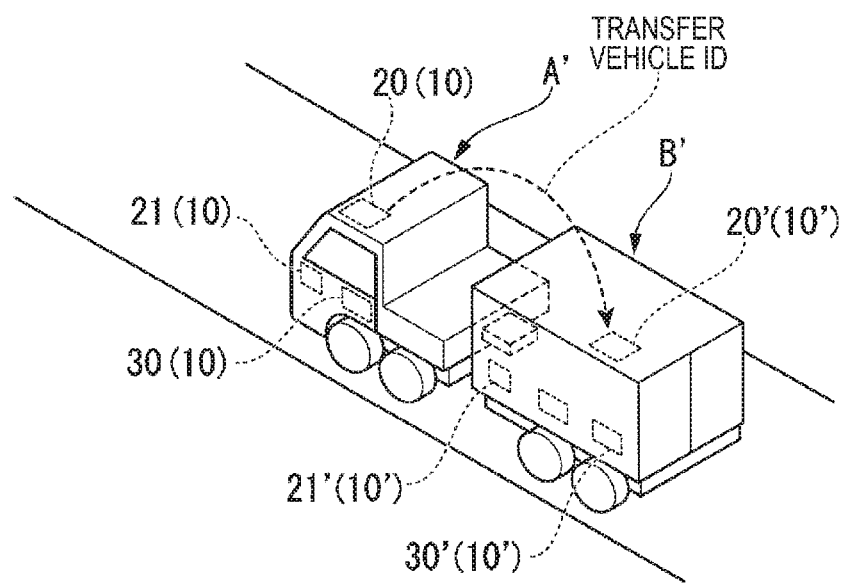
FIG. 4 is a view illustrating a modification of the present invention.

In a modification, the onboard system may be configured as illustrated in FIG. 4. In the present modification, it is given that a towing vehicle A' and a towed vehicle B' are vehicles, the towing vehicle A' is equipped with the onboard system 10, and the towed vehicle B' is equipped with an auxiliary onboard system 10'.

The onboard system 10 mounted in the towing vehicle A', as in the vehicle A, includes the onboard unit 20, the static sensor 21, and the plurality of load meters 30.

The auxiliary onboard system 10' mounted in the towed vehicle B', as in the vehicle A, includes an auxiliary onboard unit 20', a static sensor 21', and a plurality of load meters 30'. In a modification, the towed vehicle B' does not necessarily include the static sensor 21'.

In the case where the towing vehicle A' is coupled to the towed vehicle B' for a tow, the onboard unit 20 of the towing vehicle A' is connected to the auxiliary onboard unit 20' of the towed vehicle B' via a wired or wireless communication line. The vehicle ID of the towing vehicle A' is transmitted to the auxiliary onboard unit 20' via the onboard unit 20. The vehicle ID of the towing vehicle A', which is transmitted to the auxiliary onboard unit 20', is held by the auxiliary onboard unit 20'. The auxiliary onboard unit 20' adds the transmitted vehicle ID of the towing vehicle A' to each axle load acquired from the load meter 30', and transmits the axle load with the vehicle ID to the onboard unit 20 via a wired or wireless communication line. Thereby, the onboard unit 20 acquires each axle load of the towed vehicle B', with the vehicle ID of the towing vehicle A' added, from the auxiliary onboard unit 20'.

Accordingly, in the present modification, the onboard unit 20 adds each axle load of the towing vehicle A' to each axle load of the towed vehicle B', and transmits it to the first antenna 40. That is, the onboard unit 20 combines each axle load of the towing vehicle A' with each axle load of the towed vehicle B', and transmits it to the first antenna 40. At this time, like each axle load of the towing vehicle A', each axle load of the towed vehicle W, with the vehicle ID of the towing vehicle A' added, is transmitted to the first antenna 40.

In the present modification, the auxiliary onboard unit 20' can add the same vehicle ID as the vehicle IL) of the towing vehicle A' to each axle load measured in the towed vehicle B'. By adding the same vehicle ID, the charging communication processor 50 can set each axle load of the towing vehicle A' and each axle load of the towed vehicle B' as the axle load of each axle of one vehicle, and calculate a toll. In the present modification, since the onboard unit 20 combines each axle load of the towing vehicle A' with each axle load of the towed vehicle B', and transmits it to the first antenna

40, each axle load of the towing vehicle A' and each axle load of the towed vehicle B' can be transmitted in a single communication.

The auxiliary onboard unit 20' of the towed vehicle B' may acquire the vehicle ID of the towing vehicle A' at any timing before the vehicles pass the first antenna 40. For example, the timing may be the time when the towing vehicle A' is coupled to the towed vehicle 13', or the time when the towing vehicle A' that tows the towed vehicle B' starts to travel.

In another modification, each axle load of the towed vehicle B', with the vehicle ID of the towing vehicle A' added, may be transmitted directly to the first antenna 40 without being transmitted to the first antenna 40.

Charging Communication Processing Device

The configuration and function of the charging communication processor 50 will be described below in detail.

The weight information acquisition unit 51A acquires each axle load, with the vehicle ID and the identification information of the axle added, from the measurement result processing unit 20B via the first antenna 40. At this time, weight information acquisition unit 51A offers the axle loads of the vehicles having the same vehicle ID, as the axle load of each axle of one vehicle A, to the weight information calculation unit 51B.

The weight information calculation unit 51B acquires the axle load of each axle of one vehicle A via the weight information acquisition unit 51A.

The weight information calculation unit 51B calculates a representative value of the acquired axle loads of the axles of one vehicle A. In the present embodiment, the weight information calculation unit 51B calculates a maximum value as the representative value, and notifies the toll decision unit 51C of the maximum value.

Accordingly, the weight information calculation unit 51B notifies the toll decision unit 51C of the axle load that affects road damage the most among the acquired axle loads of the axles of one vehicle A.

In a modification, the weight information calculation unit 51B may calculate an average value or a mean value as the representative value.

The toll decision unit 51C uses the notified representative value to decide the toll of the vehicle A.

The representative value of the axle loads of the axles of one vehicle may be used to compare the effect of each vehicle on road damage with the effect of other vehicles. Specifically, the vehicle having a larger maximum value, average value, or the like of the axle load affects a larger effect on road damage than the vehicle having a smaller maximum value, average value, or the like of the axle load, even when the vehicles have the same total weight. Accordingly, the charging communication processor 50 can use the representative value of the axle loads of the axles of one vehicle to calculate the toll, thereby charging the toll according to the magnitude of the effect on road damage at least in comparison with the other vehicles.

In a modification, the weight information calculation unit SIB may calculate a sum (total sum) of all axle loads of the vehicle A. In this case, the weight information calculation unit 51B notifies the toll decision unit 51C of the calculated sum of all axle loads of the vehicle A. and decides the toll related to the sum of all axle loads of the vehicle A.

By deciding the toll related to the sum of all axle loads of the vehicle A, the toll related to the total amount of the vehicle A can be charged. Since the magnitude of the effect on road damage in units of vehicles is related to the total amount of the axles, the toll can be charged according to the magnitude of the effect on road damage.

In another modification, the toll decision unit 51C may acquire all axle loads of the vehicle A from the weight information calculation unit 51B as well as the number of wheels of each axle via the second antenna 80. In this case, the weight information calculation unit 51B divides the axle load by the number of wheels of each axle to calculate each wheel load (load of each wheel). The weight information calculation unit 51B calculates the representative value (maximum value, average value, or the like) of the acquired wheel loads of each wheel of one vehicle A, and notifies the toll decision unit 51C of the calculated representative value. Then, the toll decision unit 51C uses the notified representative value to decide the toll of the vehicle A.

For example, even in the case of the same axle load, each axle having a smaller number of wheels has a larger local load, and each axle having a larger number of wheels has a smaller local load. For this reason, by charging the toll based on the maximum value or the average value of the wheel loads of one vehicle, the toll can be charged according to the magnitude of the effect on road damage by wheel.

Charging Method

An embodiment of the charging method of the present invention using the charging, system 1 and the onboard system 10 will be described below.

Figure 5:
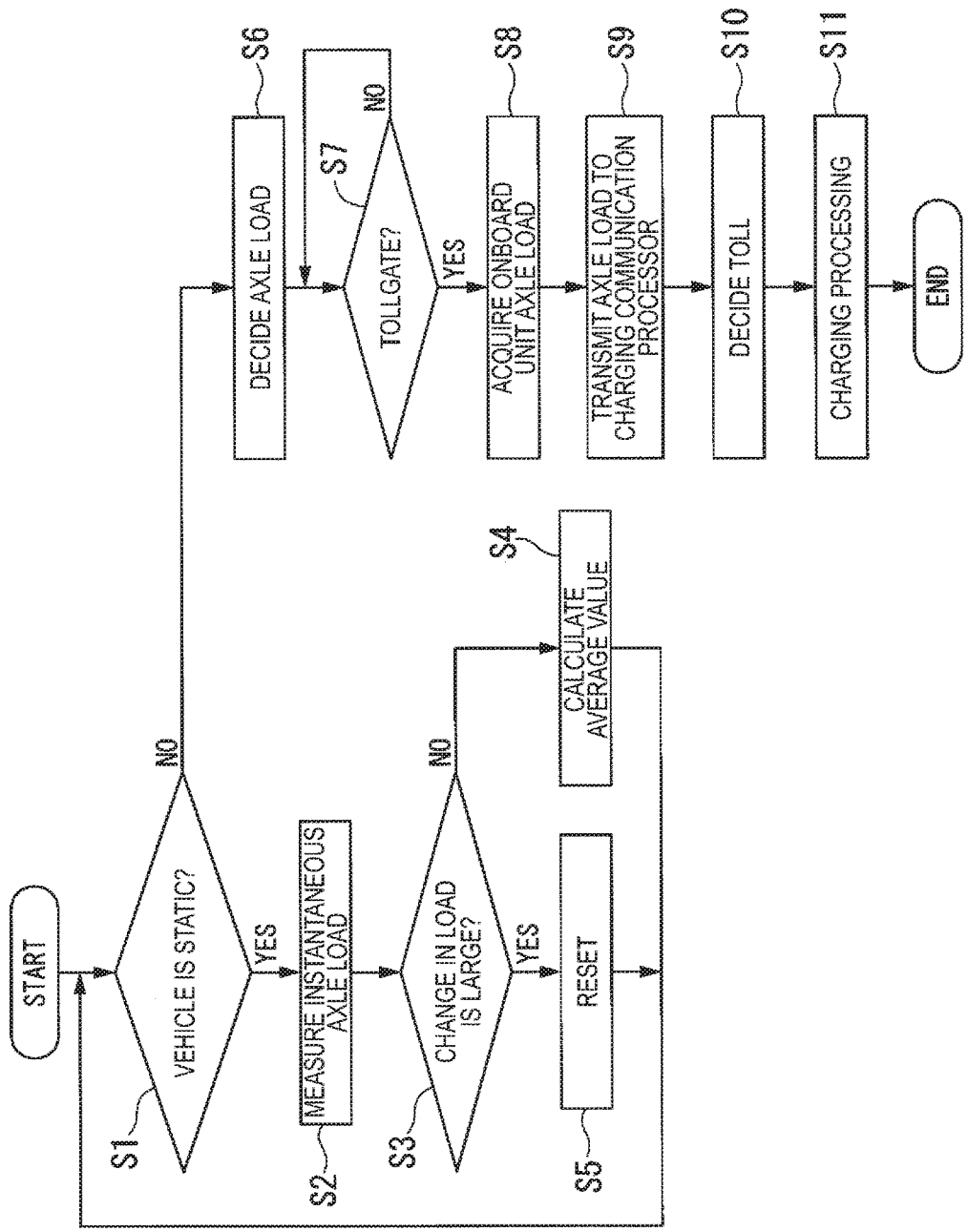
FIG. 5 is a flowchart of the embodiment of the present invention.

As illustrated in FIG. 5, each of the load meters 30 decides the load exerted on the axle or the wheel and decides the axle load (S1 to S6: load measurement steps). Subsequently, the onboard system 10 determines whether the vehicle reaches the tollgate (S7: tollgate determination step). A tollgate determination step S7 is performed by determining whether a signal transmitted from the charging system 1 to surrounding is detected by the onboard unit 20. If it is determined that the vehicle does not reach the tollgate (S7: NO), continually, it is determined whether the vehicle reaches the tollgate. If it is determined that the vehicle reaches the tollgate (S7: YES), the onboard unit 20 acquires the axle load (58: measurement result acquisition step), and transmits the axle load with the vehicle ID to the charging communication processor 50 (S9: measurement result communication step). The charging communication processor 50 decides the toll of the vehicle A based on the axle load received from the onboard system 10 (S10: toll decision step). After that, the charging system 1 executes charging processing (S11: charging processing step), transmits a result of the charging processing to the onboard unit 20 of the vehicle A, and outputs the acquired information and the result of the charging processing to the central settlement processor 70 (superior device).

The load measurement steps S1 to S6 include following steps.

First, the onboard system 10 determines whether the vehicle A is static by use of the static sensor 21 (S1: static determination step).

When the onboard system 10 determines that the vehicle A is static (S1: YES), the measurement unit 30A measures the load of each axle of the vehicle A including loaded goods at each moment (S2: instantaneous axle load measurement step). The measurement result decision unit 30C determines whether a change in the newly-measured load is large (S3: load change determination step), and when determining that the change is not large (S3: NO), the measurement result decision unit 30C sequentially calculate an average value of the acquired measurement values (54). When the measurement result decision unit 30C determines that the change in the measurement value is large (S3: YES), the average value is reset (S5), and the procedure returns to the instantaneous axle load measurement step S2.

When it is determined that the vehicle A is not static (S1: NO), the onboard system 10 decides the calculated average value as the axle load (measurement results), and outputs the axle load to the onboard unit 20 (S6: measurement result determination step).

Modification of Charging Method

As a modification, a static load may be found from the measurement result of a dynamic load measured during traveling of the vehicle A. Specifically, this is as follows.

Figure 6:
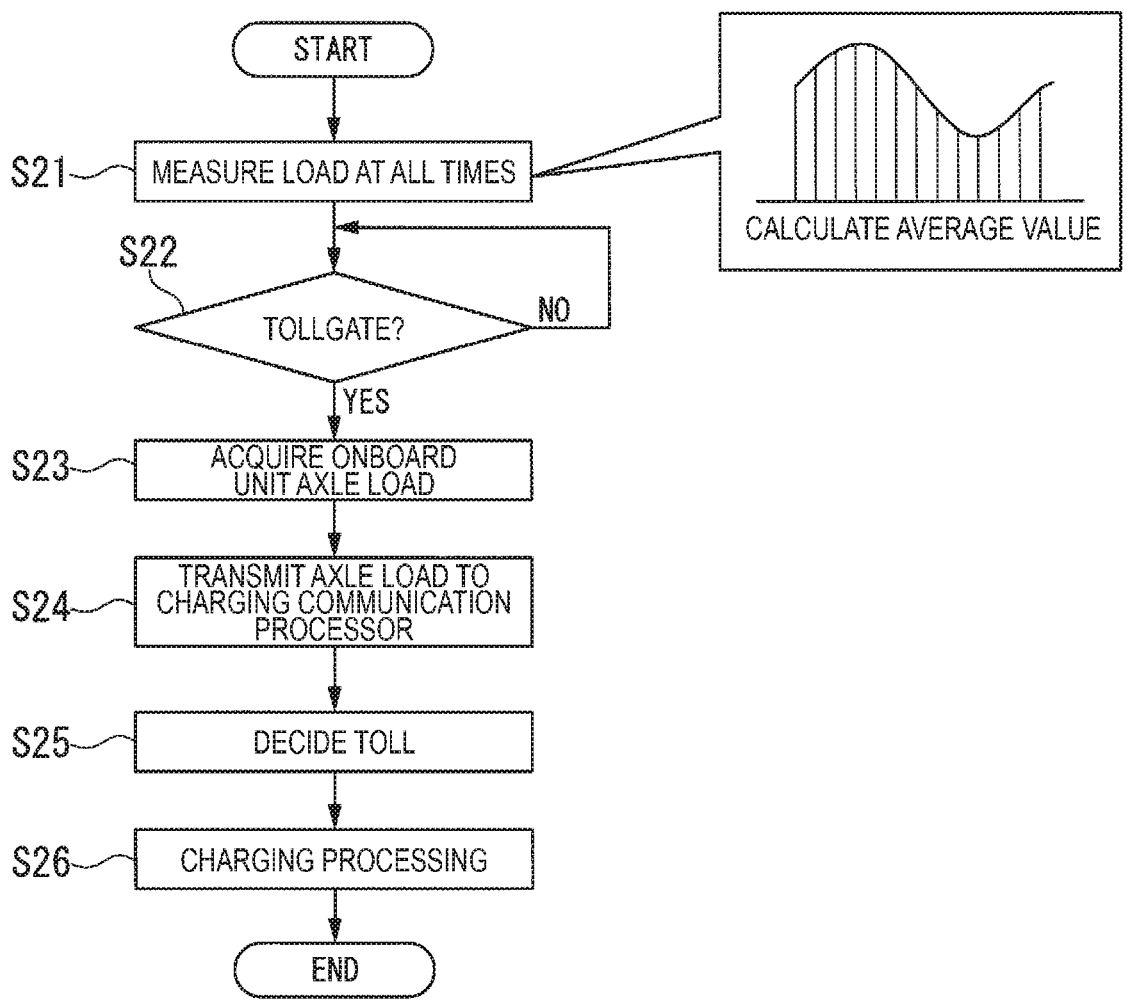
FIG. 6 is a flowchart of a modification of the present invention.

As illustrated in FIG. 6, each of the load meters 30 measures the load at all times during traveling (S21: all-time load measurement step). At this time, the load measured at each moment is a dynamic load and therefore, needs to be converted into a static load. To convert the dynamic load into the static load, for example, a time average of dynamic loads may be calculated, and the calculated average load may be defined as the static load. Further, in the case where vibrations during traveling of the vehicle vary in the form of sine wave as illustrated in a balloon in FIG. 6, the dynamic load can be converted into the static load more accurately by detecting the cycle of the dynamic load of each axle during traveling and calculating the time average of the loads during one cycle. Then, as in the present embodiment, a tollgate determination step S22, a measurement result acquisition step S23, a measurement result communication step S24, a toll decision step S25, and a charging processing step S26 are performed.

Since the axle load immediately before the entry into the tollgate can be measured by converting the dynamic load measured during traveling into the static load, the toll related to latest static axle load can be charged without being affected by vibrations and acceleration.

Actions and Effects

The actions and effects according to the present embodiment will be described.

In the present embodiment, the onboard system 10 can communicate information on the measured weight of the vehicle to the roadside machine. Thus, there is no need to install equipment for measuring the weight of the vehicle on a road surface. The charging system 1 can use the information on the weight of the vehicle, which is measured by the onboard system, to decide the toll. Therefore, the charging system equipped with the onboard system does not require closure of the lane for the installation work.

Further, the onboard system 10 uses the static load measured in the static state to decide the static load of each axle and therefore, can decide the measurement result without being affected by vibrations and acceleration during traveling.

The charging system 1 can decide the toll related to the representative value of the measurement results of each axle. The magnitude of the effect on road damage in units of vehicles is related to, for example, a representative value such as maximum value, average value, or mean value of the axle load of the vehicle (including loaded goods). For this reason, the charging system can charge a toll according to the magnitude of the effect on road damage.

In particular, since the charging system 1 decides the toll related to the maximum value of measurement results of each axle, the toll related to the local maximum load in unit of axle can be charged even to vehicles having the same total weight.

In addition, since the charging system 1 decides the toll related to the average value of measurement results of each axle, the toll related to the number of axles can be charged even to vehicles having the same total weight.

In the embodiments described above, the various processes are implemented by a program for achieving the various functions of the charging information processing unit of the charging system and the onboard unit of the onboard system. The program is recorded on a computer-readable recording medium, and the program recorded on the recording medium is read and executed by a computer system to execute the various functions. The steps of each process of each CPU described above are stored in a computer readable recording medium in the form of a program, and these various processes are implemented by the computer reading out and executing this program. Examples of the computer-readable recording medium include magnetic disks, magneto-optical disks, CD-ROMs, DVD-ROMs, and semiconductor memories. This computer program may be distributed to the computer on a communication line, and the computer that receives this distribution may execute the program.

Moreover, the various functions of the charging information processing unit of the charging system and the onboard unit of the onboard system may be provided by a plurality of devices connected by a network.

In the foregoing, certain embodiments of the present invention have been described, but these embodiments are merely illustrative and are not intended to limit the scope of the invention. These embodiments may be implemented in various other forms, and various omissions, substitutions, and alterations may be made without departing from the gist of the invention. These embodiments and modifications are included in the scope and gist of the invention and are also included in the scope of the invention described in the claims and equivalents thereof.

For example, the present embodiment is the charging system for the toll amount of toll roads, but may be applied to a charging system for parking toll of parking sites.

In the present embodiment, the charging: processing is executed using the wireless communication system (Electronic Toll Collection System (ETC) (trade name)), RFID, or the like). However, the present invention may be applied to an automatic toll collection machine that presents the toll and the like to the driver (user) of the vehicle A and executes toll collection processing.

In the present embodiment, for high-speed processing, the onboard system communicates with the first antenna and the second antenna. However, when high-speed processing is not required, the onboard system may communicate with only one antenna.

In a following case, the charging system does not necessarily include the second antenna.

As in the case of cash settlement, when the charging system includes an automatic toll collection machine that presents the toll and the like to the driver (user) of the vehicle A and executes toll collection processing, there is no need to receive detail information (the number of axles, the number of wheels of each axle, vehicle ID, vehicle-type classification, card information, entry information, and the like) of the vehicle and transmit charging data to the onboard unit of the passing vehicle. For this reason, the charging system does not need to transmit and receive the detail information and the charging data on the vehicle A and thus, does not necessarily include the second antenna.

In the case where the charging system requires no high-speed processing, the charging system can transmit and receive information via the first antenna in place of the second antenna to omit the second antenna.

The present embodiment is a separate lane mode installed on the islands I. However, in a modification, the present invention may be applied to a charging system according to a free-flow mode.

INDUSTRIAL APPLICABILITY

The onboard system according to the present invention does not require closure of a lane for the installation work of the charging system.

REFERENCE SIGNS LIST

1 Charging system
10 Onboard system
10' Auxiliary onboard system
20 Onboard unit
20' Auxiliary onboard unit
20A Vehicle information holding unit
20B Measurement result processing unit
21 Static sensor
21' Static sensor
30 Load meter
30' Load meter
30A Measurement unit
30B Measurement value acquisition unit
30C Measurement result decision unit
40 First antenna (roadside machine)
50 Charging communication processor
51 Charging information processing unit
51A Weight information acquisition unit
51B Weight information calculation unit
51C Toll decision unit
60 Entry-side vehicle detector
70 Central settlement processor
80 Second antenna
91 Departure controller
92 Departure-side vehicle detector
A Vehicle
A' Towing vehicle
B' Towed vehicle
I Island
J Remote location
L Lane

The invention claimed is:

1. An onboard system comprising:
a plurality of load meters mounted in a vehicle, the load meters each measuring a load exerted on an axle or a wheel and deciding a measurement result;
an onboard unit that acquires the measurement results of the load meters and is capable of communicating weight information on the weight of the vehicle based on the measurement results to a roadside machine; and
a static sensor that detects that the vehicle is static and transmits a static detection signal to the onboard unit,
wherein the onboard unit adds identification information on the axles to the weight information and transmits the weight information to the roadside machine,
wherein, in response to the static detection signal, the onboard unit transmits a request signal to each of the load meters, and
wherein, in response to the request signal, each of the load meters decides the measurement result of the corresponding axle.

2. The onboard system according to claim 1, wherein each of the load meters calculates an average of loads of the vehicle during traveling, and decides a static load of each of the axles as the measurement result.

3. The onboard system according to claim 1, wherein
the load meters are mounted in each of a towing vehicle and a towed vehicle, which together make up the vehicle, and
the onboard unit acquires measurement results of the load meters, and transmits the weight information on the weight of the towing vehicle based on the measurement result and weight information on the weight of the towed vehicle based on the measurement result to a roadside machine.

4. A charging system comprising:
the roadside machine capable of communicating with the onboard system according to claim 1; and
a toll decision unit that decides a toll based on the weight information on the weight of the vehicle, the weight information being received by the roadside machine.

5. The charging system according to claim 4, further comprising a weight information calculation unit that calculates a representative value of the measurement results of each of the axles.

6. The charging system according to claim 5, wherein the representative value is a maximum value or an average value of the measurement results of each of the axles.

7. The charging system according to claim 4, further comprising a weight information calculation unit that calculates a sum of the measurement results of the axles.

8. A charging method comprising:
a load measurement step of measuring a load exerted on an axle or a wheel and deciding a measurement result by use of a plurality of load meters mounted in a vehicle;
a measurement result communication step of acquiring the measurement result and communicating weight information on a weight of the vehicle based on the measurement result to a roadside machine by use of an onboard unit of the vehicle;
a detecting step of detecting that the vehicle is static and transmitting a static detection signal to the onboard unit; and
a toll decision step of deciding a toll based on the information on the weight of the vehicle, the information being received by the roadside machine,
wherein, in the measurement result communication step, the onboard unit adds identification information on the axles to the weight information and transmits the weight information to the roadside machine,
wherein, in the measurement result communication step, in response to the static detection signal, the onboard unit transmits a request signal to each of the load meters, and
wherein, in the load measurement step, in response to the request signal, each of the load meters decides the measurement result of the corresponding axle.

9. A non-transitory storage medium that stores a program causing a computer of an onboard system including a plurality of load meters, the load meters each being mounted in a vehicle and measuring a load exerted on an axle or a wheel, to function as:
a vehicle information holding unit that holds information on the vehicle; and
a measurement result processing unit that acquires measurement results of the load meters, adds the information related to the vehicle to information on a weight of the vehicle based on the measurement results, and transmits the information to a roadside machine, wherein the onboard system includes a static sensor that detects that the vehicle is static and transmits a static detection signal to an onboard unit, wherein the measurement result processing unit adds identification information on the axles to the weight information and transmits the weight information to the roadside machine, wherein, in response to the static detection signal, the measurement result processing unit transmits a request signal to each of the load meters, and wherein, in response to the request signal, each of the load meters decides the measurement result of the corresponding axle.

\* \* \* \* \*